United States Patent
Hobday et al.

(10) Patent No.: US 10,604,716 B2
(45) Date of Patent: Mar. 31, 2020

(54) GEAR OIL COMPOSITION

(71) Applicant: CRODA INTERNATIONAL PLC, Goole Yorkshire (GB)

(72) Inventors: Ian Hobday, Yorkshire (GB); John Eastwood, Cleveland (GB); Mark Embleton, Yorkshire (GB); Louise O'Sullivan, Yorkshire (GB)

(73) Assignee: Croda International PLC (GB)

(*) Notice: Subject to any disclaimer, the term of this patent is extended or adjusted under 35 U.S.C. 154(b) by 0 days.

(21) Appl. No.: 15/024,546

(22) PCT Filed: Sep. 11, 2014

(86) PCT No.: PCT/GB2014/052751
§ 371 (c)(1),
(2) Date: Mar. 24, 2016

(87) PCT Pub. No.: WO2015/044639
PCT Pub. Date: Apr. 2, 2015

(65) Prior Publication Data
US 2016/0237368 A1 Aug. 18, 2016

(30) Foreign Application Priority Data
Sep. 30, 2013 (GB) .................................. 1317278.8

(51) Int. Cl.
*C10M 129/76* (2006.01)
*F03D 80/70* (2016.01)
*F16H 57/04* (2010.01)
*C10N 40/04* (2006.01)

(52) U.S. Cl.
CPC ........... *C10M 129/76* (2013.01); *F03D 80/70* (2016.05); *F16H 57/0493* (2013.01); *F16H 57/0498* (2013.01); *C10M 2203/1006* (2013.01); *C10M 2203/1025* (2013.01); *C10M 2205/0285* (2013.01); *C10M 2207/281* (2013.01); *C10M 2207/282* (2013.01); *C10M 2207/289* (2013.01); *C10N 2040/04* (2013.01); *C10N 2230/06* (2013.01); *C10N 2230/24* (2013.01); *C10N 2230/26* (2013.01); *C10N 2240/02* (2013.01); *C10N 2240/04* (2013.01)

(58) Field of Classification Search
CPC ............................................... C10M 2207/281
USPC ....................................................... 508/463
See application file for complete search history.

(56) References Cited

U.S. PATENT DOCUMENTS

| | | | |
|---|---|---|---|
| 3,505,307 A | 4/1970 | Foehr | |
| 5,376,186 A * | 12/1994 | Uchida | C10M 159/20 148/29 |
| 5,750,476 A | 5/1998 | Nibert | |
| 6,531,429 B2 | 3/2003 | Fletschinger et al. | |
| 8,096,205 B2 | 1/2012 | Okamoto et al. | |
| 2002/0016266 A1 | 2/2002 | Fletschinger | |
| 2005/0090410 A1 | 4/2005 | Devlin | |
| 2006/0111253 A1* | 5/2006 | Harris | C10M 141/08 508/459 |
| 2006/0276354 A1 | 12/2006 | Donaghy | |
| 2011/0059877 A1 | 3/2011 | Obiols | |
| 2012/0165235 A1* | 6/2012 | Li | C10M 129/08 508/369 |
| 2015/0203778 A1 | 7/2015 | Iovine et al. | |

FOREIGN PATENT DOCUMENTS

| | | |
|---|---|---|
| EP | 0826765 A1 | 3/1998 |
| EP | 1503113 A2 | 2/2005 |
| EP | 2441818 | 4/2012 |
| JP | H11217577 A | 8/1999 |
| JP | 2005061610 A | 3/2005 |
| JP | 2011140643 A | 7/2011 |
| JP | 2015521685 A | 7/2015 |
| WO | 03031543 | 4/2003 |
| WO | 2011070141 A2 | 6/2011 |
| WO | 2012152309 A1 | 11/2012 |
| WO | 2014001521 A1 | 1/2014 |

OTHER PUBLICATIONS

International Preliminary Report on Patentability and Written Opinion of the International Searching Authority for International Application No. PCT/GB2014/052751 dated Apr. 5, 2016.
International Search Report for International Application No. PCT/GB2014/052751 dated Nov. 25, 2014.
Zhu, Y., et al., "Investigation of factors influencing wheel-rail adhesion using a mini-traction machine," Jul. 15, 2012, pp. 218-231, vol. 292-293, Wear (abstract only).
Notice of Reasons for Refusal for Japanese Application No. 2016-544781, dated Oct. 24, 2017, 5 pages.
European Communication Pursuant to Article 94(3) EPC, dated Oct. 14, 2019 5 pages.

* cited by examiner

*Primary Examiner* — Vishal V Vasisth
(74) *Attorney, Agent, or Firm* — RatnerPrestia

(57) ABSTRACT

The present invention relates to a gear oil composition containing a base stock and at least 0.01 wt % of a friction reducing additive which comprises a glycerol and/or polyglycerol $C_{12}$ to $C_{24}$ saturated fatty ester. The gear oil composition is suitable for use in gear boxes in automotive, industrial and marine applications.

18 Claims, No Drawings

GEAR OIL COMPOSITION

CROSS REFERENCE TO RELATED APPLICATIONS

This application is the National Stage filing of International Appln. No. PCT/GB2014/052751, filed 11 Sep. 2014, and claims priority of GB Application No. 1317278.8, filed 30 Sep. 2013, the entirety of which applications is incorporated herein by reference for all purposes.

FIELD OF INVENTION

The present invention relates to a gear oil composition comprising a base stock and a friction reducing additive, in particular to an industrial, automotive and/or marine gear oil composition and use thereof.

BACKGROUND

Economic and environmental demands on gear oil compositions means that they are being pushed to their performance limits. The choice of the combination of base stock and additive package is crucial. In particular, additives are required to reduce friction. A wide range of friction reducing additives are currently used commercially in gear oils such as esters, partial esters, phosphonates, organomolybdenum-based compounds, fatty acids, higher alcohols, fatty acid esters, sulfur containing esters, phosphate esters, acid phosphoric acid esters, and amine salts of phosphoric acid esters. However, these materials can have drawbacks such as water entrainment/emulsification and/or foaming; and/or insufficient friction reduction, seal compatibility, paint compatibility, thermal and/or oxidative stability. Thus, there is a need for improved friction reducing additives in gear oils, particularly for use in automotive, marine and in industrial applications such as in mining; paper, textile and sugar mills; steel production and in wind turbines.

SUMMARY OF THE INVENTION

We have now surprisingly discovered an improved gear oil composition which overcomes or significantly reduces at least one of the aforementioned problems.

Accordingly, the present invention provides a gear oil composition comprising a base stock and at least 0.01 wt % of a friction reducing additive which comprises a glycerol and/or polyglycerol $C_{12}$ to $C_{24}$ saturated fatty ester.

The present invention also provides a gear box comprising a gear oil composition comprising a base stock and at least 0.01 wt % of a friction reducing additive which comprises a glycerol and/or polyglycerol $C_{12}$ to $C_{24}$ saturated fatty ester.

The present invention further provides a wind turbine comprising a gear box comprising a gear oil composition comprising a base stock and at least 0.01 wt % of a friction reducing additive which comprises a glycerol and/or polyglycerol $C_{12}$ to $C_{24}$ saturated fatty ester.

The present invention still further provides a method of reducing friction in a gear box which comprises using a gear oil composition comprising a base stock and at least 0.01 wt % of a friction reducing additive which comprises a glycerol and/or polyglycerol $C_{12}$ to $C_{24}$ saturated fatty ester.

The present invention yet further provides the use of a glycerol and/or polyglycerol $C_{12}$ to $C_{24}$ saturated fatty ester to reduce the kinetic co-efficient of friction of a gear oil composition.

The gear oil composition according to the present invention may be an industrial, automotive and/or marine gear oil.

The specification of industrial gear oil compositions is governed primarily by American Gear Manufacturers Association (AGMA) in North America or by individual manufacturers themselves. A typical specification for an American industrial gear oil is shown in Table 1.

TABLE 1

AGMA 9005-D94 Viscosity classification for gear oils.

|  | viscosity mPa · s at 40° C. | | Equivalent ISO viscosity class | EP gear oils AGMA |
|---|---|---|---|---|
|  | min | max | (ISO 2448) | lub. no. |
| 0 | 28.8 | 35.2 | 32 |  |
| 1 | 41.4 | 50.6 | 46 |  |
| 2 | 61.2 | 74.8 | 68 | 2 EP |
| 3 | 90 | 110 | 100 | 3 EP |
| 4 | 135 | 165 | 150 | 4 EP |
| 5 | 198 | 242 | 220 | 5 EP |
| 6 | 288 | 352 | 320 | 6 EP |
| 7C[1) | 414 | 506 | 460 | 7 EP |
| 8C[1) | 612 | 748 | 680 | 8 EP |
| 8AC[1) | 900 | 1100 | 1000 | 8 A EP |

In Europe, as well as most of the Rest of the World, industrial gear oil specifications are typically written by Deutches Institut fur Normung (DIN). There are also OEM (Original European Manufacturer) specific approvals/specifications such as Siemens MD (previously known as Flender) and Hansen.

Industrial gear oil compositions include those suitable for use in gear boxes with spur, helical, bevel, hypoid, planetary and worm gears. Suitable applications include use in mining; mills such as paper, textile and sugar mills; steel production and in wind turbines. One preferred application is in wind turbines where the gear boxes typically have planetary gears.

Automotive gear oil compositions include those suitable for use in manual transmissions, transfer cases and differentials which all typically use a hypoid gear. By transfer case we mean a part of a four wheel drive system found in four wheel drive and all wheel drive systems. It is connected to the transmission and also to the front and rear axles by means of driveshafts. It is also referred to in the literature as a transfer gearcase, transfer gearbox, transfer box or jockey box.

Automotive gear oil compositions will normally have a viscosity in the range of SAE 50 to SAE 250, and more usually will range from SAE 70W to SAE 140. Suitable automotive base oils also include cross-grades such as 75W-140, 80W-90, 85W-140, 85W-90, and the like. Automotive gear oils are classified by the American Petroleum Institute (API) using GL ratings. API classification subdivides all transmission oils into 6 classes as follows;

API GL-1, oils for light conditions. They consist of base oils without additives. Sometimes they contain small amounts of antioxidizing additives, corrosion inhibitors, depresants and antifoam additives. API GL-1 oils are designed for spiral-bevel, worm gears and manual transmissions without synchronizers in trucks and farming machines.

API GL-2, oils for moderate conditions. They contain antiwear additives and are designed for worm gears. Recommended for proper lubrication of tractor and farming machine transmissions.

API GL-3, oils for moderate conditions. Contain up to 2.7% antiwear additives. Designed for lubricating bevel and other gears of truck transmissions. Not recommended for hypoid gears.

API GL-4, oils for various conditions-light to heavy. They contain up to 4.0% effective antiscuffing additives. Designed for bevel and hypoid gears which have small displacement of axes, the gearboxes of trucks, and axle units. Recommended for non-synchronized gearboxes of US trucks, tractors and buses and for main and other gears of all vehicles. These oils are basic for synchronized gearboxes, especially in Europe.

API GL-5, oils for severe conditions. They contain up to 6.5% effective antiscuffing additives. The general application of oils in this class are for hypoid gears having significant displacement of axes. They are recommended as universal oils to all other units of mechanical transmission (except gearboxes). Oils in this class, which have special approval of vehicle manufacturers, can be used in synchronized manual gearboxes only. API GL-5 oils can be used in limited slip differentials if they correspond to the requirements of specification MIL-L-2105D or ZF TE-ML-05. In this case the designation of class will be another, for example API GL-5+ or API GL-5 LS.

API GL-6, oils for very heavy conditions (high speeds of sliding and significant shock loadings). They contain up to 10% high performance antiscuffing additives. They are designed for hypoid gears with significant displacement of axes. Class API GL-6 is not applied any more as it is considered that class API GL-5 well enough meets the most severe requirements.

Most modern automotive gear boxes require an API GL-4 oil, and separate differentials (where fitted) require an API GL-5 oil.

The specification of marine gear oil compositions is governed by DIN 51517, AGMA 9005, Flender, and Hansen, with DIN 51517 and AGMA 9005 being the most important.

Marine thruster gearboxes have specific gear oils that include a higher proportion of additives, e.g. dispersants, anticorrosives, to deal with corrosion and water entrainment compared to industrial and automotive gear oils. There are also outboard gear oils used for the propeller unit which may be more relevant for smaller vessels.

The gear oil compositions of the present invention can be based on natural or synthetic oils, or blends thereof, provided the composition has a suitable viscosity for use in the particular gear oil application. The base stock may be selected based on the intended use of the gear oil composition. The base stock for the gear oil composition can be mineral oil base stocks such as for example conventional and solvent-refined paraffinic neutrals and bright stocks, hydrotreated paraffinic neutrals and bright stocks, naphthenic oils, cylinder oils, etc., including straight run and blended oils. Synthetic base stocks can also be used, such as for example PAO, alkylated aromatics, polybutenes, diesters, polyol esters, polyglycols, polyphenyl ethers, etc., and blends thereof. It is also known for PAOs and esters to be blended with mineral oils to form semi synthetics.

The American Petroleum Institute (API) currently defines five groups of lubricant base stocks (API Publication 1509). Groups I, II and III are mineral oils which are classified by the amount of saturates and sulphur they contain and by their viscosity indices. Table 2 below illustrates these API classifications for Groups I, II and III.

TABLE 2

| Group | Saturates | Sulphur | Viscosity Index (VI) |
|---|---|---|---|
| I | <90% | >0.03% | 80-120 |
| II | At least 90% | Not more than 0.03% | 80-120 |
| III | At least 90% | Not more than 0.03% | At least 120 |

Group I base stocks are solvent refined mineral oils, which are the least expensive base stock to produce, and currently account for the majority of base stock sales. They provide satisfactory oxidation stability, volatility, low temperature performance and traction properties and have very good solvency for additives and contaminants. Group II base stocks are mostly hydroprocessed mineral oils, which typically provide improved volatility and oxidation stability as compared to Group I base stocks. The use of Group II stocks has grown to about 30% of the US market. Group III base stocks are severely hydroprocessed mineral oils or they can be produced via wax or paraffin isomerisation. They are known to have better oxidation stability and volatility than Group I and II base stocks but have a limited range of commercially available viscosities.

Group IV base stocks differ from Groups I to III in that they are synthetic base stocks e.g. polyalphaolefins (PAOs). PAOs have good oxidative stability, volatility and low pour points. Disadvantages include moderate solubility of polar additives, for example antiwear additives.

Group V base stocks are all base stocks that are not included in the other Groups. Examples include alkyl naphthalenes, alkyl aromatics, vegetable oils, esters (including polyol esters, diesters and monoesters), polycarbonates, silicone oils and polyalkylene glycols.

The gear oil composition according to the present invention preferably comprises at least 50 wt %, more preferably at least 60 wt %, particularly at least 70 wt %, and especially at least 80 wt % of base stock, based upon the total weight of the composition. The gear oil composition preferably comprises up to 99 wt %, more preferably up to 97 wt %, particularly up to 94 wt %, and especially up to 90 wt % of base stock, based upon the total weight of the composition.

The friction reducing additive of the gear oil composition comprises, consists essentially of, or consists of, at least one glycerol and/or polyglycerol $C_{12}$ to $C_{24}$ saturated fatty ester.

The fatty chain of the friction reducing additive does not contain any carbon-carbon double bonds and is suitably a hydrocarbyl radical, and preferably an alkyl group. The fatty chain preferably comprises in the range from 14 to 24, more preferably 16 to 24, particularly 18 to 22, and especially 18 carbon atoms. The fatty chain may be linear or branched, and preferably is branched.

The term "polyglycerol" as used herein means diglycerol, triglycerol, tetraglycerol, pentaglycerol, hexaglycerol, heptaglycerol, octaglycerol, nonaglycerol and decaglycerol and/or mixtures thereof. The polyglycerol component is preferably selected from the group consisting of diglycerol, triglycerol, tetraglycerol, pentaglycerol, and mixtures thereof; more preferably is selected from the group consisting of diglycerol, triglycerol, tetraglycerol and mixtures thereof; and particularly is selected from the group consisting of diglycerol, triglycerol and mixtures thereof. In a particularly preferred embodiment of the invention, the polyglycerol is diglycerol. The friction reducing additive is preferably a glycerol and/or diglycerol $C_{12}$ to $C_{24}$ saturated fatty ester, and more preferably a diglycerol $C_{12}$ to $C_{24}$ saturated fatty ester.

The glycerol and/or polyglycerol used to obtain the friction reducing additive are preferably unsubstituted, i.e. the glycerol and polyglycerol do not have any substituents for or in any of their hydroxyl groups. In a preferred embodiment, the glycerol and polyglycerol component comprises less than 15 wt %, more preferably less than 10 wt %, and particularly less than 5 wt % of any other polyol. Preferably, the reaction to form the friction reducing agent is carried out substantially in the absence of any polyols other than glycerol and/or polyglycerol.

The friction reducing additive is suitably obtainable by reacting glycerol and/or polyglycerol with a fatty acid and/or ester thereof, i.e. is a glycerol and/or polyglycerol $C_{12}$ to $C_{24}$ saturated fatty acid ester. The friction reducing additive is obtainable by direct esterification of a fatty acid, acid chloride or acid anhydride with glycerol and/or polyglycerol; or by transesterification of a fatty acid ester with glycerol and/or polyglycerol. If a fatty acid ester is used, it is preferably a $C_1$ to $C_6$ alkyl ester, more preferably a $C_1$ to $C_4$ alkyl ester, and particularly a $C_1$ to $C_2$ alkyl ester. Mixtures of fatty acid esters may also be used. Preferably the friction reducing additive is obtainable by direct esterification of a fatty acid described herein with glycerol and/or polyglycerol.

The fatty acid is suitably a $C_{12}$ to $C_{24}$, preferably a $C_{16}$ to $C_{24}$, more preferably a $C_{18}$ to $C_{22}$, particularly a $C_{18}$ saturated carboxylic acid, and especially a monocarboxylic acid.

Suitable fatty acids can be obtained from natural sources such as, for instance, plant or animal esters (e.g. palm oil, rape seed oil, palm kernel oil, coconut oil, babassu oil, soybean oil, castor oil, tallow, whale or fish oils, grease, lard, and mixtures thereof). Any unsaturated fatty acids that are present in fatty acid mixtures obtained from natural sources can be removed by hydrogenation with a suitable catalyst. The fatty acids can also be synthetically prepared, for example as described in "Fatty Acids in Industry", Ed. Robert W Johnson, Earl Fritz, Marcel Dekker Inc, 1989 ISBN 0-8247-7672-0.

Accordingly, suitable linear fatty acids include cocoate, capric, lauric, myristic, palmitic, stearic, behenic acids and mixtures thereof; and suitable branched fatty acids include iso-acids such as isostearic acid, isopalmitic acid, isomyristic acid, isobehenic acid and mixtures thereof. In one embodiment, the fatty acid is isostearic acid and/or isobehenic acid, and more preferably isostearic acid.

In one preferred embodiment the fatty acid is branched. Preferred branched chain fatty acids are isostearic acid, isomyristic acid, and/or isobehenic acid, more preferably isostearic acid and/or isobehenic acid, and particularly isostearic acid.

Isostearic acid can be produced as a byproduct of the polymerisation of the naturally occurring unsaturated oleic acid to produce dimer/trimer acid. Heating the oleic acid in the presence of certain catalysts produces dimeric, trimeric and higher polymeric products, but instead of polymerising, a portion of the acid rearranges to give a branched, monomeric fatty acid which can be isolated by distillation and then hydrogenated. The saturated branched, monomeric fatty acid is a mixture of various linear and mainly branched, both mono and poly branched, saturated acids which is known as isostearic acid. Similarly, isobehenic acid can be produced by using erucic acid instead of oleic acid in the above process.

Particularly suitable branched chain fatty acids contain alkyl side branches (attached directly to a carbon atom of the longest linear chain) having on average less than 5, preferably less than 3, more particularly in the range of 1.05 to 2, especially 1.1 to 1.5 carbon atoms, i.e. the side branches are predominantly methyl groups.

The fatty acid and/or ester thereof used to produce the friction reducing additive used in the present invention suitably has an iodine value of not more than 20, preferably not more than 15, more preferably not more than 10, particularly not more than 5, and especially not more than 2 gI/100 g. The fatty acid and/or ester thereof preferably has a cloud point of not more than 25° C., more preferably not more than 15° C., particularly not more than 10° C., and especially not more than 8° C.

The friction reducing additive may be a mono-, di-, tri-, tetra-, higher-ester and mixtures thereof; more preferably a mono-, di-, tri-ester and mixtures thereof; particularly a mono-, di-ester and mixture thereof. The friction reducing additive is normally a composition comprising a mixture of esters.

In one preferred embodiment, the concentration in the friction reducing additive of (i) monoesters is preferably at least 10 wt %, more preferably at least 15 wt %, particularly at least 20 wt %, and especially at least 25 wt % by weight, and/or (ii) diesters is preferably at least 20 wt %, more preferably at least 25 wt %, particularly at least 30 wt %, and especially at least 40 wt % by weight, and/or (iii) the combination of monoesters and diesters is preferably at least 40 wt %, more preferably at least 50 wt %, particularly at least 60 wt %, and especially at least 65 wt % by weight, and/or (iv) the combination of tri-, tetra- and higher-esters is preferably not more than 10 wt %, more preferably not more than 20 wt %, particularly not more than 25 wt %, and especially not more than 30 wt % by weight, all based upon the total weight of fatty esters of glycerol and/or polyglycerol in the composition.

The friction reducing additive suitably has an iodine value of not more than 20, preferably not more than 15, more preferably not more than 10, particularly not more than 5, and especially not more than 2 gI/100 g.

The gear oil composition preferably comprises at least 0.05 wt %, more preferably at least 0.1 wt %, particularly at least 0.5 wt %, and especially at least 1 wt % of friction reducing additive defined herein, based upon the total weight of the composition. The gear oil composition preferably comprises up to 10 wt %, more preferably up to 5 wt %, particularly up to 3 wt %, and especially up to 2 wt % of friction reducing additive defined herein, based upon the total weight of the composition.

The gear oil composition is preferably non-aqueous, however it will be appreciated that the components of the gear oil composition may contain small amounts of residual water (moisture). The gear oil composition preferably comprises less than 5 wt %, more preferably less than 2 wt %, particularly less than 1 wt %, and especially less than 0.5 wt % of water, based upon the total weight of the composition. Preferably the gear oil composition is substantially anhydrous.

The gear oil composition may further comprise one or more of the following additive types;

1. Dispersants, for example: alkenyl succinimides, alkenyl succinate esters, alkenyl succinimides modified with other organic compounds, alkenyl succinimides modified by post-treatment with ethylene carbonate or boric acid, pentaerythritols, phenate-salicylates and their post-treated analogs, alkali metal or mixed alkali metal, alkaline earth metal borates, dispersions of hydrated alkali metal borates, dispersions of alkaline-earth metal borates, polyamide ashless dispersants and the like or mixtures of such dispersants.

2. Anti-oxidants: Anti-oxidants reduce the tendency of base oils to deteriorate in service which deterioration is evidenced by the products of oxidation such as sludge and varnish-like deposits on the metal surfaces and by an increase in viscosity. Examples of anti-oxidants include phenol type (phenolic) oxidation inhibitors, such as 4,4'-methylene-bis(2,6-di-tert-butylphenol), 4,4'-bis(2,6-di-tert-butylphenol), 4,4'-bis(2-methyl-6-tert-butylphenol), 2,2'-methylene-bis(4-methyl-6-tert-butyl-phenol), 4,4'-butylidene-bis(3-methyl-6-tert-butylphenol), 4,4'-isopropylidene-bis(2,6-di-tert-butylphenol), 2,2'-methylene-bis(4-me-thyl-6-nonylphenol), 2,2'-isobutylidene-bis(4,6-dimethylphenol), 2,2'-methylene-bis(4-methyl-6-cyclohexylphenol), 2,6-di-tert-butyl-4-methylphenol, 2,6-di-tert-butyl-4-ethylphenol, 2,6-di-tert-butylphenol, 2,4-dimethyl-6-tert-butyl-phenol, 2,6-di-tert-1-dimethylamino-p-cresol, 2,6-di-tert-4-(N,N'-dimethylamino-methylphenol), 4,4'-thiobis(2-methyl-6-tert-butylphenol), 2,2'-thiobis(4-methyl-6-tert-butylphenol), bis(3-methyl-4-hydroxy-5-tert-butylbenzyl)-sulfide, and bis(3,5-di-tert-butyl-4-hydroxy-benzyl). Other types of oxidation inhibitors include alkylated diphenylamines (e.g., Irganox L-57 from BASF), metal dithiocarbamate (e.g., zinc dithiocarbamate), and methylenebis(dibutyldithiocarbamate).

3. Antiwear agents: These agents reduce wear of moving metallic parts. Examples of such agents include, but are not limited to, phosphates, phosphites, carbamates, esters, sulfur containing compounds, and molybdenum complexes.

4. Demulsifiers, for example: addition products of alkylphenol and ethylene oxide, polyoxyethylene alkyl ethers, and polyoxyethylene sorbitan esters.

5. Extreme pressure agents (EP agents), for example: zinc dialkyldithiophosphate (primary alkyl, secondary alkyl, and aryl type), sulfurized oils, diphenyl sulfide, methyl trichlorostearate, chlorinated naphthalene, fluoroalkylpolysiloxane, and lead naphthenate. A preferred EP agent is zinc dialkyl dithiophosphate (ZnDTP) as one of the co-additive components for the antiwear gear oil composition 6. Multifunctional additives, for example: sulfurized oxymolybdenum dithiocarbamate, sulfurized oxymolybdenum organo phosphorodithioate, oxymolybdenum monoglycehde, oxymolybdenum diethylate amide, amine-molybdenum complex compound, and sulfur-containing molybdenum complex compound.

7. Viscosity index improvers, for example: polymethacrylate polymers, ethylene-propylene copolymers, styrene-isoprene copolymers, hydrogenated styrene-isoprene copolymers, polyisobutylene, and dispersant type viscosity index improvers.

8. Pour point depressants, for example: polymethacrylate polymers.

9. Foam inhibitors, for example: alkyl methacrylate polymers and dimethyl silicone polymers.

The gear oil composition preferably comprises one or more additive(s) which may include at least one species of extreme-pressure agent selected from the group consisting of sulfur-based additives and phosphorus-based additives, or at least one species of the extreme-pressure agents and at least one species of additive selected from the group consisting of solubilizing agent, ashless dispersant, pour point depressant, antifoaming agent, antioxidant, rust inhibitor, and corrosion inhibitor.

Other additives may be present in the gear oil composition of known functionality at levels between 0.01 to 30%, more preferably between 0.01 to 20% more especially between 0.01 to 10% of the total weight of the gear oil formulation. These can include detergents, extreme pressure/antiwear additives, dispersants, corrosion inhibitors, rust inhibitors, friction modifiers, foam depressants, pour point depressants, and mixtures thereof. Extreme pressure/antiwear additives include ZDDP, tricresyl phosphate, amine phosphates. Corrosion inhibitors include sarcosine derivatives, for example Crodasinic O available from Croda Europe Ltd. Foam depressants include silicones and organic polymers. Pour point depressants include polymethacrylates, polyacrylates, polyacrylamides, condensation products of haloparaffin waxes and aromatic compounds, vinyl carboxylate polymers, terpolymers of dialkylfumarates, vinyl esters of fatty acids and alkyl vinyl ethers. Ashless detergents include carboxylic dispersants, amine dispersants, Mannich dispersants and polymeric dispersants. Friction modifiers include amides, amines and partial fatty acid esters of polyhydric alcohols. Ash-containing dispersants include neutral and basic alkaline earth metal salts of an acidic organic compound. Additives may have more than one functionality in a single material.

The gear oil composition may further comprise an antioxidant preferably in the range 0.2 to 2%, more preferably 0.4 to 1% by weight. Antioxidants include hindered phenols, alkyl diphenylamines and derivatives and phenyl alpha naphthylamines and derivatives of. Gear oil compositions with the presence of the antioxidant preferably exhibit a percentage viscosity loss, measured using a modified version of CEC L-40-A-93, over a 100 hour period of less than 20%, more preferably less than 15% and especially less than 10%.

The gear oil composition may comprise friction reducing agents other than those defined herein such as esters, partial esters, phosphonates, organomolybdenum-based compounds, fatty acids, higher alcohols, fatty acid esters, sulfur containing esters, phosphate esters, acid phosphoric acid esters, and amine salts of phosphoric acid esters. Other friction reducing agents can be defined as materials, other than glycerol and/or polyglycerol $C_{12}$ to $C_{24}$ saturated fatty esters defined herein, whose presence in a gear oil composition results in the coefficient of friction of the gear oil composition when measured by a mini-traction machine (MTM) at a load of 1.0 GPa, as described herein, being reduced by at least 5%, more preferably by at least 10%, particularly by at least 15%, and especially by at least 20%.

In one preferred embodiment, the gear oil composition according to the present invention comprises only friction reducing agents which are glycerol and/or polyglycerol $C_{12}$ to $C_{24}$ saturated fatty esters. Thus, one preferred gear oil composition consists essentially of, or consists of, friction reducing agents which are glycerol and/or polyglycerol $C_{12}$ to $C_{24}$ saturated fatty esters.

The gear oil composition preferably comprises at least 0.05 wt %, more preferably at least 0.5 wt %, particularly at least 1 wt %, and especially at least 1.5 wt % of further additive(s) (additive pack), based upon the total weight of the composition. The gear oil composition preferably comprises up to 15 wt %, more preferably up to 10 wt %, particularly up to 4 wt %, and especially up to 2.5 wt % of further additive(s) (additive pack), based upon the total weight of the composition.

The additive or additives may be available in the form of a commercially available additive pack. Such additive packs vary in composition depending on the required use of the additive pack. A skilled person may select a suitable commercially available additive pack for each of type of gear oil.

Suitable additive packs for industrial gear oils include Hitec 307 (for wind turbines), 315, 317 and 350 (ex Afton); Irgalube ML 605 A (ex BASF); Lubrizol IG93MA, 506, 5064 and 5091 (ex Lubrizol); Vanlube 0902 (ex Vanderbilt); RC 9330, 9410 and 9451 (ex Rhein Chemie); NA-LUBE BL-1208 (ex King Industries);

One preferred use of the gear oil composition according to the present invention is in a wind turbine gear box. A gear box is typically placed between the rotor of a wind turbine blade assembly and the rotor of a generator. The gear box may connect a low-speed shaft turned by the wind turbine blade(s) rotor at about 10 to 30 rotations per minute (rpm), to one or more high speed shafts that drive the generator at about 1000 to 2000 rpm, the rotational speed required by most generators to produce electricity. The high torque exerted in the gear-box can generate huge stress on the gears and bearings in the wind turbine. A gear oil composition according to the present invention may enhance the fatigue life of the gear box of a wind turbine by reducing the friction between the gears.

Gear oil compositions in wind turbine gear boxes are often subjected to prolonged periods of use between maintenance i.e. long service intervals. Therefore a long lasting gear oil composition with high stability may be required, so as to provide suitable performance over lengthy durations of time.

The friction reducing additive used in the present invention reduces the coefficient of friction of a gear oil composition, particularly when measured using a mini-traction machine (MTM), when compared to an equivalent gear oil composition comprising no friction reducing additive. The coefficient of friction may be a kinetic coefficient of friction.

The friction reducing additive defined herein is capable of reducing the coefficient of friction of a gear oil composition, when compared to an equivalent composition comprising no friction reducing additive, by at least 10%, preferably by at least 20%, more preferably by at least 30%, particularly by at least 35%, and especially by at least 40% when using a mini-traction machine, in the test described herein, at a load of 1.0 GPa.

High frequency friction reciprocating (HFRR) testing is a recognised screening tool for wear evaluation. A wear scar of less than 250 μm, preferably less than 200 μm, more preferably less than 180 μm, particularly less than 160 μm, and especially less than 140 μm measured using HFRR, in the test described herein, is preferably obtained when the gear oil composition according to the present invention is used.

The gear oil composition may have a kinematic viscosity according to an ISO grade. An ISO grade specifies the mid-point kinematic viscosity of a sample at 40° C. in cSt (mm$^2$/s). For example, ISO 100 has a viscosity of 100±10 cSt and ISO 1000 has a viscosity of 1000±100 cSt. The gear oil composition preferably has a viscosity in the range from ISO 10 to ISO 1500, more preferably ISO 68 to ISO 680.

Gear oil compositions according to the invention have good low temperature properties. The viscosity of such formulations at −35° C. is less than 120,000 centapoise (cP), more preferably less than 100,000 cP, especially less than 90,000 cP.

The invention has been illustrated by the following non-limiting examples.

The following test procedures were used;
(i) Mini-Traction Machine (MTM)

The coefficient of friction of a gear oil composition (control composition with no friction-reducing additive) comprising 89 wt % of a mixture of Group IV base stocks (85 wt % Synfluid PAO 10 and 4 wt % Synfluid PAO 40 (polyalphaolefin), ex Exxon Mobil), 10 wt % of a Group V base stock (Priolube™3970 (synthetic polyol ester), ex Croda) and 1 wt % of an additive package (RC9330, ex Rhein Chemie) was determined at 100° C. using a MTM with a steel ball on a smooth disc. The measurements were repeated using the control composition above containing an additional 1 wt % of the friction reducing additive being evaluated (test composition).

The MTM was supplied by PCS Instruments of London, UK. This machine provides a method for measuring the coefficient of friction of a given lubricant using a ball-on-disc configuration whilst varying several properties such as speed, load and temperature. The MTM is a computer controlled precision traction measurement system whose test specimens and configuration have been designed such that realistic pressures, temperatures and speeds can be attained without requiring large loads, motors or structures. The disc was AISI 52100 hardened bearing steel with a mirror finish (Ra<0.01 μm) and the ball was AISI 52100 hardened bearing steel. The load applied was varied between 5 and 75 N (0.7-1.7 GPa contact pressure) and the speed of rotation was fixed at 0.05 m/s. The test specimens were a 12.7 mm (half inch) steel ball and a 32 mm diameter steel disc. Approximately 50 ml of the gear oil composition was then added. The ball was loaded against the face of the disc and the ball and disc were driven independently to create a mixed rolling/sliding contact with a slide-roll ratio of 50%. The frictional force between the ball and disc was measured by a force transducer. Additional sensors measured the applied load and lubricant temperature.

The gear oil composition was heated to 100° C. and a load of 5 N (corresponding to 0.66 GPa) was applied using the ball. The coefficient of friction was measured by the MTM at a speed of 0.05 m/s with a slide-roll-ratio (SRR) of 50%. Ten data points were taken at this load, which were averaged to obtain the overall coefficient of friction. A recirculating step of 10 minutes with no load was run before the load was increased to 15 N and the above measurements were repeated at this new loading. This process was repeated at 25, 35, 45, 55, 65 and 75 N load.

(ii) High Frequency Reciprocating Rig (HFRR)

The HFRR, supplied by PCS Instruments of London, UK, is a computer-controlled reciprocating friction and wear test which provides a fast, repeatable assessment of the performance of fuels and lubricants. A steel ball is mounted against a steel disc and moved rapidly in a reciprocating motion at speeds and stroke lengths predetermined by the user. Temperature, load and test duration are also controlled by the machine operator.

A 2 ml sample of the gear oil composition was introduced into a small reservoir containing a test disc. A steel ball was attached to a movable arm and gently lowered into the reservoir until contact with the disc was made. A load of 400 g was then applied to the arm and the test profile was started. The profile used had the following parameters:

| Parameter | Value |
|---|---|
| Stroke Length | 1000 μm |
| Frequency | 20 Hz |
| Load | 400 g |
| Temperature | 100° C. |
| Test Duration | 1 hour |

Upon starting the profile, the HFRR heated the sample to 100° C. before commencing the reciprocating motion of the ball arm. The ball was moved back and forth over the disc at a stroke length of 1000 μm with a frequency of 20 Hz for 1 hour. A force transducer was used to measure the coefficient of friction throughout the test, and the wear scar created on the ball was recorded upon the test's completion as an average of the horizontal and vertical wear scar lengths measured in μm using a microscope.

The coefficient of friction was measured over time using the control gear oil composition used in the MTM test described above and the test composition containing an additional 1 wt % of the friction reducing additive being evaluated.

(iii) Demulsification Test

The demulsification properties of the control and test gear oil compositions described in the MTM and HFRR tests above were determined using a water separability test as per ASTM D1401.

In a 100 ml graduated measuring cylinder 40 ml of the gear oil composition was added to 40 ml of deionised water slowly so as to avoid premature mixing of the two test fluids. This vessel was then placed in a heated water bath set to maintain a stable temperature of 54±1° C. Once the test cylinder had reached the correct temperature a stainless steel stirrer paddle (length 120 mm, width 19 mm) was lowered into the cylinder and held in place 6 mm from the bottom of the cylinder through a clamping mechanism fitted to the apparatus. The stirrer was then rotated at a speed of 1500 rpm for 5 minutes, after which it was turned off and removed from the cylinder. Remnant emulsion clinging to the paddle was pushed back into the main body of emulsion in the cylinder using a pipette. At this point the stirrer was removed from the apparatus and the emulsion was left standing in the water bath (maintaining the temperature at 54° C.) for 30 minutes, after which time the appearance of the mixture was recorded in terms of ml oil phase/ml water phase/ml emulsion.

EXAMPLES

Example 1

A friction reducing additive was produced by mixing 280.5 g diglycerol and 719.5 g isostearic acid. 3 g tin oxalate catalyst was added and the mixture was heated to 230° C. The temperature was maintained until the acid value of the mixture was below 1.5 mgKOH/g, at which point the transparency of the product was checked visually. If the product was not transparent, the reaction was continued at the same temperature until transparency was achieved. The reaction was then cooled to 80-90° C., and 4 g phosphoric acid (75 wt %) was added in order to neutralise the catalyst. The product was then filtered to remove solid impurities. If required, a deodorisation process was performed by applying live steam to the product at 125-135° C. for about 2 hours. The final product had a saponification value of 146 mgKOH/g, an acid value of 1.4 mgKOH/g, an iodine value of 1.7 gI/100 g, and contained a mixture of 28 wt % mono-, 41 wt % di- and 28 wt % tri-isostearate esters of diglycerol and 3 wt % of unreacted diglycerol.

Example 2

The friction reducing additive (FRA) produced in Example 1 was evaluated using the test procedures described herein and the results were as follows;

(i) MTM

| | Coefficient of Friction | |
|---|---|---|
| Load (GPa) | Control Composition | Test Composition (+1 wt % of FRA of Example 1) |
| 0.66 | 0.099 | 0.069 |
| 0.95 | 0.092 | 0.065 |
| 1.13 | 0.087 | 0.062 |
| 1.26 | 0.083 | 0.061 |
| 1.37 | 0.081 | 0.061 |
| 1.47 | 0.081 | 0.060 |
| 1.55 | 0.079 | 0.060 |
| 1.63 | 0.078 | 0.060 |

The results show that the addition of 1 wt % of the friction reducing additive of Example 1 reduced the coefficient of friction by about 30% (0.069 compared to 0.099) at a load of 0.66 GPa and by about 23% at a load of 1.63 GPa when compared to the same formulation without the friction reducing additive.

(ii) HFRR (a)

| | Coefficient of Friction | |
|---|---|---|
| Time (s) | Control Composition | Test Composition (+1 wt % of FRA of Example 1) |
| 100 | 0.137 | 0.135 |
| 600 | 0.142 | 0.143 |
| 1100 | 0.148 | 0.146 |
| 1600 | 0.151 | 0.130 |
| 2100 | 0.148 | 0.110 |
| 2600 | 0.149 | 0.090 |
| 3100 | 0.150 | 0.082 |
| 3600 | 0.148 | 0.078 |

The results show that the addition of 1 wt % of the friction reducing additive of Example 1 reduced the coefficient of friction by about 47% after 3600 seconds when compared to the same formulation without the friction reducing additive.

(b)

| | Wear Scar (μm) |
|---|---|
| Control Composition | 254.1 |
| Test Composition (+ 1 wt % of FRA of Example 1) | 152.0 |

The results show that the addition of 1 wt % of the friction reducing additive of Example 1 reduced the wear scar on the ball specimen by 40%.

(iii) Demulsification Test

| | Volume (ml) | |
|---|---|---|
| Phase | Control Composition | Test Composition (+1 wt % of FRA of Example 1) |
| Oil | 12 | 36 |
| Water | 37 | 31 |
| Emulsion | 31 | 13 |

The results show that the addition of 1 wt % of the friction reducing additive of Example 1 produced a much less stable emulsion than the control composition containing no friction reducing additive.

The above examples illustrate the improved properties of a gear oil composition according to the present invention.

The invention claimed is:

1. A gear oil composition comprising a base stock, at least 0.01 wt % of a friction reducing additive which comprises a diglycerol $C_{12}$ to $C_{24}$ saturated fatty ester, wherein the friction reducing additive has an iodine value of not more than 20 gI/100 g, and an anti-wear agent selected from phosphates, phosphites, carbamates, esters, and molybdenum complexes, wherein the diglycerol $C_{12}$ to $C_{24}$ saturated fatty ester comprises at least 10 wt % of monoester, and at least 20 wt % of diester, based upon the total weight of fatty esters of diglycerol in the composition, and the diglycerol $C_{12}$ to $C_{24}$ saturated fatty ester has a cloud point of not more than 25° C.

2. The gear oil composition as claimed in claim 1 comprising a diglycerol $C_{18}$ to $C_{22}$ saturated fatty ester.

3. The gear oil composition as claimed in claim 1 wherein the friction reducing additive is obtained by reacting diglycerol with a fatty acid and/or ester thereof.

4. The gear oil composition as claimed in claim 3 wherein the fatty acid is isostearic acid and/or isobehenic acid.

5. The gear oil composition as claimed in claim 1 wherein the diglycerol $C_{12}$ to $C_{24}$ saturated fatty ester comprises at least 20 wt % of monoester and at least 20 wt % of diester, based upon the total weight of fatty esters of diglycerol in the composition.

6. The gear oil composition as claimed in claim 1 wherein the diglycerol $C_{12}$ to $C_{24}$ saturated fatty ester comprises at least 10 wt % of monoester, and at least 30 wt % of diester, based upon the total weight of fatty esters of diglycerol in the composition.

7. The gear oil composition as claimed in claim 1 wherein the base stock is selected from the group consisting of an API Group I, II, III, IV, V base oil or mixtures thereof.

8. The gear oil composition as claimed in claim 1 wherein the friction reducing additive reduces the coefficient of friction of the composition when measured by a mini-traction machine at a load of 1.0 GPa by at least 20%.

9. A gear box comprising a gear oil composition as defined in claim 1.

10. The gear box as claimed in claim 9 comprising a spur, helical, bevel, hypoid and/or worm gear.

11. A wind turbine comprising the gear box as claimed in claim 9.

12. A method of reducing friction in a gear box which comprises lubricating the gear box with the gear oil composition as defined in claim 1.

13. The method as claimed in claim 12 wherein the coefficient of friction of the gear oil composition when measured by a mini-traction machine at a load of 1.0 GPa is reduced by at least 20%.

14. The gear oil composition as claimed in claim 1 wherein the friction reducing additive consists of a diglycerol $C_{18}$ to $C_{22}$ saturated fatty ester.

15. The gear oil composition as claimed in claim 1 wherein the anti-wear agent comprises a phosphate.

16. The gear oil composition as claimed in claim 1 further comprising an extreme pressure agent.

17. A gear oil composition comprising a base stock, a gear oil additive pack, an anti-wear agent selected from phosphates, phosphites, carbamates, esters, and molybdenum complexes, and at least 0.01 wt % of a friction reducing additive which comprises a diglycerol $C_{12}$ to $C_{24}$ saturated fatty ester, wherein the friction reducing additive has an iodine value of not more than 20 gI/100 g, and wherein the diglycerol $C_{12}$ to $C_{24}$ saturated fatty ester comprises at least 10 wt % of monoester, and at least 20 wt % of diester, based upon the total weight of fatty esters of diglycerol in the composition, and the diglycerol $C_{12}$ to $C_{24}$ saturated fatty ester has a cloud point of not more than 25° C.

18. The gear oil composition as claimed in claim 1 wherein the anti-wear agent comprises a zinc dialkyldithiophosphate.

* * * * *